United States Patent
Issacci et al.

(10) Patent No.: US 7,211,342 B2
(45) Date of Patent: May 1, 2007

(54) FUEL CELL SYSTEM WITH REGENERATIVE BED

(75) Inventors: Farrokh Issacci, Playa del Rey, CA (US); Rajiv Doshi, Torrance, CA (US)

(73) Assignee: General Electric Company, Schenectady, NY (US)

( * ) Notice: Subject to any disclaimer, the term of this patent is extended or adjusted under 35 U.S.C. 154(b) by 475 days.

(21) Appl. No.: 10/249,503

(22) Filed: Apr. 15, 2003

(65) Prior Publication Data

US 2004/0209134 A1    Oct. 21, 2004

(51) Int. Cl.
- H01M 8/00 (2006.01)
- H01M 8/04 (2006.01)
- H01M 8/12 (2006.01)

(52) U.S. Cl. .............. 429/12; 429/22; 429/26
(58) Field of Classification Search ............ None
See application file for complete search history.

(56) References Cited

U.S. PATENT DOCUMENTS 5,462,817 A * 10/1995 Hsu ................. 429/19
5,942,344 A * 8/1999 Lehmeier et al. .......... 429/13
6,740,437 B2 * 5/2004 Ballantine et al. ......... 429/23

OTHER PUBLICATIONS

Bejan, Adrian and Kraus, Allan D. 2003. Heat Transfer Handbook. Hoboken: John Wiley & Sons, Inc.*

* cited by examiner

*Primary Examiner*—Patrick Joseph Ryan
*Assistant Examiner*—Julian Mercado
(74) *Attorney, Agent, or Firm*—Sutherland Asbill & Brennan LLP

(57) ABSTRACT

A partial fuel cell system for converting a flow of a reactant to electricity and a flow of exhaust gases. The partial fuel cell system may include a first heat exchanger for exchanging heat between the flow of exhaust gases and the flow of the reactant, a second heat exchanger for exchanging heat between the flow of exhaust gases and the flow of the reactant, and a flow controller for controlling the flow of the reactant to the second heat exchanger.

27 Claims, 4 Drawing Sheets

FUEL CELL SYSTEM WITH REGENERATIVE BED

BACKGROUND OF INVENTION

Technical Field

The present invention relates generally to fuel cells and more particularly relates to a fuel cell system using a regenerative bed for transient operations.

Fuel cells electrochemically react fuels with oxidants to generate electricity. A fuel cell generally includes a cathode material, an electrolyte material, and an anode material. The electrolyte may be a non-porous material positioned between the cathode and the anode materials. The fuel and the oxidant typically are gases that continually flow about the anode, the cathode, and the electrolyte through separate passageways. A fuel gas may be hydrogen, a short-chain hydrocarbon, or a gas containing a desired chemical species in some form. An oxidant may be an oxygen-containing gas, or quite commonly, air. The fuel and the oxidant typically are pre-heated before being fed to the electrolyte.

A common fuel cell is a solid oxide fuel cell ("SOFC"). A SOFC uses a solid electrolyte for power generation. The solid electrolyte may be an ion-conducting ceramic or a polymer membrane. For example, the electrolyte may be a non-conductive ceramic, such as a dense yttria-stabilized zirconia (YSZ) membrane. The anode may be a nickel/YSZ cermet and the cathode may be a doped lanthanum manganite.

The electrochemical conversion occurs at or near the three-phase boundary of each electrode (the cathode and the anode) and the electrolyte. The fuel is electrochemically reacted with the oxidant to produce a direct current electrical output. The anode or the fuel electrode enhances the rate at which the electrochemical reaction occurs on the fuel side. The cathode or the oxidant electrode functions similarly on the oxidant side. The electrochemical reaction between the fuel and the oxidant produces electrical energy, spent fuel, and oxidant exhaust. This conversion of fuel and oxidant to electricity also produces heat, particularly at high current-power densities.

To achieve higher voltages for a specific application, the individual electrochemical cells may be connected in series to form a fuel cell stack. To achieve higher currents, individual cells may be connected in parallel. The electrical connection between the cells may be achieved by the use of an electrical interconnect between the cathode and the anode of adjacent cells. The electrical interconnect also may provide for passageways for oxygen to flow pass the cathode and fuel to flow pass the anode. Ducts or manifolds generally also are used to conduct the fuel and the oxidant into and out of the stack.

The heat produced in the reaction generally should be removed from the stack to maintain the fuel cells at an efficient operating temperature. The hot exhaust gas from the stack may be further combusted and/or fed to one or more heat exchangers. For example, the incoming fuel and/or the incoming oxidant may be preheated such that the gases enter the stack at higher, more efficient temperatures. Further, the incoming fuel flow may be processed with air and/or steam before entry into the stack. The exhaust gases also may be used to heat the air or to heat a water stream into steam. The more efficiently the spent gases may be reused in the system may have a significant impact on the efficiency of the system as a whole.

During transient operations when power demands increase, however, larger fuel and oxidant flows may be directed to the fuel cell stack. At higher flow rates, the fuel and oxidant preheating processes may be less efficient in that the fuel and the oxidant may enter the stack at temperatures lower than desired. Such lower temperatures may adversely affect the performance of the stack.

SUMMARY OF INVENTION

The present invention thus provides a partial fuel cell system for converting a flow of a reactant to electricity and a flow of exhaust gases. The partial fuel cell system may include a first heat exchanger for exchanging heat between the flow of exhaust gases and the flow of the reactant, a second heat exchanger for selectively exchanging heat between the flow of exhaust gases and the flow of the reactant, and a flow controller for controlling the flow of the reactant to the second heat exchanger. The reactant may include a fuel or an oxidant. The second heat exchanger may include a regenerative bed. The regenerative bed may be a channeled bed or a sequential bed.

A further embodiment of the present invention may provide a partial fuel cell system with a stack assembly for converting a flow of a fuel and a flow of an oxidant to electricity and a flow of exhaust gases. The partial fuel cell system may have a first heat exchanger for exchanging heat between the flow of exhaust gases from the stack assembly and the flow of the fuel and the oxidant and a second heat exchanger for selectively exchanging heat between the flow of exhaust gases from the stack assembly and the flow of the fuel and the oxidant. The fuel cell system also may have a flow controller system for controlling the flow of the fuel and the flow of the oxidant to the second heat exchanger.

A method of the present invention may provide for delivering a flow of reactant to a fuel cell stack at a predetermined temperature using the exhaust gases of the fuel cell stack. The method may include the steps of exchanging heat in a first heat exchanger between the exhaust gases of the fuel cell stack and the flow of reactant, determining a load on the fuel cell stack, and selectively exchanging heat in a second heat exchanger between the exhaust gases of the fuel cell stack and the flow of reactant based upon the determined load on the fuel cell stack.

These and other features of the present invention will become apparent upon review of the following detailed description when taken in conjunction with the drawings and the appended claims.

DETAILED DESCRIPTION

Figure 1:
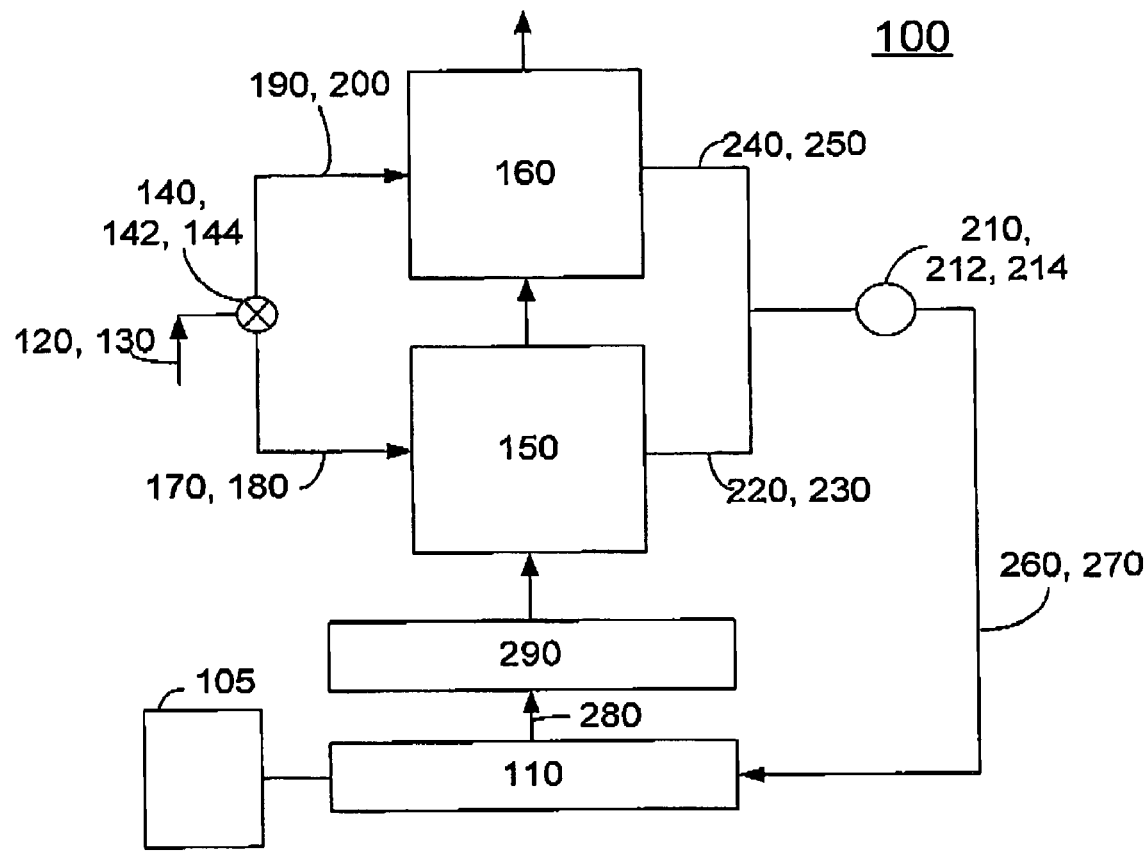
FIG. 1 is a schematic view of a partial fuel cell system with regenerative heating.

Referring now to drawings, in which like numerals represent like elements throughout the several views, FIG. 1 shows a schematic view of a partial fuel cell system 100 of the present invention. The operation of the partial fuel cell system 100 and the components therein may be set, monitored, and controlled by a microprocessor 105 or a similar type of control device. Various temperature, load, flow, pressure, and/or other types of sensors or monitors may be used with the microprocessor 105 or otherwise in the partial fuel cell system 100.

The partial fuel cell system 100 may include a stack assembly 110. The stack assembly 110 may include solid oxide fuel cells, hybrid solid oxide fuel cells, molten carbonate fuel cells, and other types of fuel cell designs. As was described above, the reactants may be fed into the stack assembly 110 to produce electricity in the electrochemical reaction. The electrochemical reaction also produces thermal energy in the form of exhaust heat and spent gases. The reactants may be a flow of the fuel and/or a flow of the oxidant.

The system 100 further may include a fuel inlet 120 so as to supply a flow of the fuel and/or an oxidant inlet 130 so as to supply a flow of the oxidant or air. The fuel and the oxidant may be pressurized by any conventional means. For example, one or more compressors or similar types of devices may be used. Likewise, one or more fan or similar types of air movement devices also may be used.

The fuel inlet 120 and the oxidant inlet 130 may direct the fuel and the oxidant to one or more flow controllers 140. The flow controllers 140 may be simple on-off valves or similar types of devices. The flow controller 140 may be activated by the microprocessor 105 in response to the load or other variables associated with the system 100 in general and the stack assembly 110 in specific.

The flow controllers 140 may direct a flow of the fuel and/or a flow of the oxidant to a recuperator 150 only or to both the recuperator 150 and a regenerative bed 160. Separate flow controllers 140 may be used for the fuel and the oxidant. A fuel flow controller 142 may be connected to the recuperator 150 via a fuel recuperator inlet 170 while an oxidant flow controller 144 may be connected to the recuperator 150 via an oxidant recuperator inlet 180. Likewise, the fuel flow controller 143 may be connected to the regenerative bed 160 via a fuel regenerative bed inlet 190 while the oxidant flow controller 144 may be connected to the regenerative bed 160 via an oxidant regenerative bed inlet 200. It is understood that the fuel and the oxidant flow separately through the recuperator 150, the regenerative bed 160, and though the other elements described herein.

The recuperator 150 generally may be a heat exchanger for exchanging heat between the hot, spent gases of the stack assembly 110 and the cooler incoming flow of the fuel and the oxidant. The recuperator 150 thus may increase the temperature of the incoming flow of the fuel and/or the oxidant to a predetermined temperature at anticipated flow rates. The recuperator 150 may be any type of cross or counter-flow type heat exchanger. Other types of heat exchange devices or flow configurations also may be used.

The regenerative bed 160 also may function as a heat exchanger. The regenerative bed 160 exchanges heat between the spent gases and the incoming flow of the fuel and/or the oxidant. As described in more detail below, the spent gases from the stack assembly 110 may first flow through the recuperator 150 and then through the regenerative bed 160 or first through the regenerative bed 160 and then through the recuperator 150. Other flow configurations also may be used. Examples of possible designs of the regenerative bed 160 also are described in more detail below.

The recuperator 150 and the regenerative bed 160 may be connected to one or more mixers 210. The mixers 210 may be a conventional three-way valve, a T-joint, or a similar design. A fuel mixer 212 may be connected to the recuperator 150 via a fuel recuperator outlet 220 while an oxidant mixer 214 may be connected to the recuperator 150 via an oxidant recuperator outlet 230. The fuel mixer 212 also may be connected to the regenerative bed 160 via a fuel regenerative bed outlet 240 while the oxidant mixer 214 may be connected to the regenerative bed 160 via an oxidant regenerative bed outlet 250. The fuel mixer 212 may mix the flow of the fuel from the recuperator 750 and the regenerative bed 160 while the oxidant mixer 214 may mix the flow of the oxidant from the recuperator 150 and the regenerative bed 160. In turn, the mixed flow of the fuel and the mixed flow of the oxidant from the mixers 210 may enter the stack assembly 110 via a fuel stack inlet 260 and an oxidant stack inlet 270.

The fuel and the oxidant thus enter the stack assembly 110 where the electrochemical reaction produces electricity and thermal energy in the form of exhaust heat and spent gases as was described above. The spent gases may exit the stack assembly 110 via a stack exhaust outlet 280. The stack exhaust outlet 280 may be in communication with the recuperator 150, the regenerative bed 160, and/or other fuel system components 290 such as a turbine, a steam regenerator, or other types of components requiring a heat source. As described below, the recuperator 150, the regenerative bed 160, and the other fuel system components 290 may be positioned in any desired order. After passing through the recuperator 150, the regenerative bed 160, and/or the other fuel system components 290, the spent gases may be vented to the atmosphere and/or otherwise used.

Figure 2:
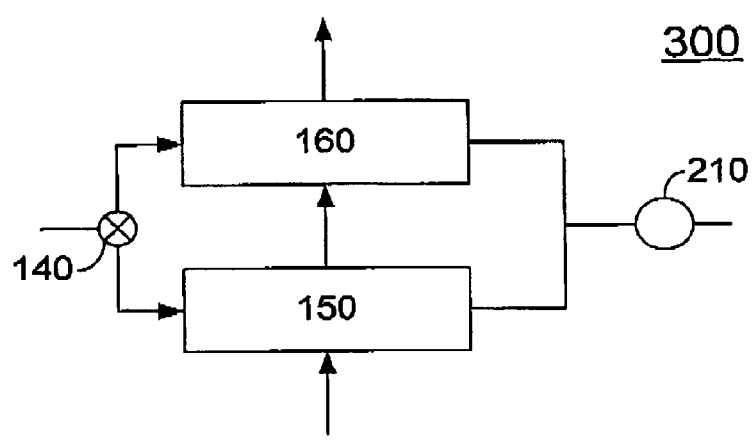
FIG. 2 is a schematic view of a partial fuel cell system with a regenerative bed following a recuperator.
Figure 3:
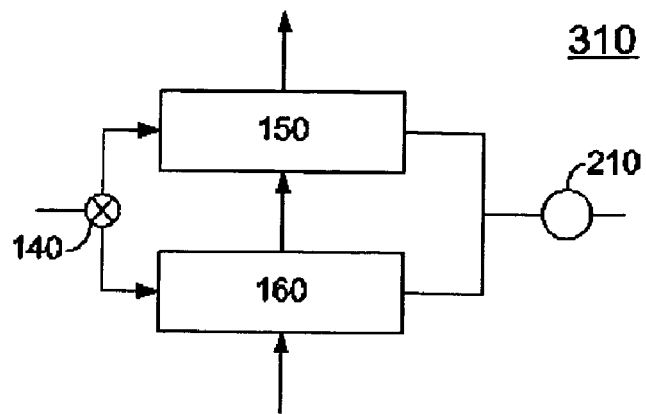
FIG. 3 is a schematic view of a partial fuel cell system with a recuperator following a regenerative bed.

FIGS. 2 and 3 show alternative locations of the recuperator 150 and the regenerative bed 160 in the partial fuel cell system 100. For example, a partial fuel cell system 300 of FIG. 2 has the recuperator 150 positioned downstream of the stack 110 and/or the other fuel cell components 290 with the regenerative bed 160 downstream of the recuperator 150. Alternatively, FIG. 3 shows a partial fuel cell system 310 with the respective positions of the recuperator 150 and the regenerative bed 160 reversed. In this case, the regenerative bed 160 is downstream of the stack 110 and/or the other fuel cell components 290 with the recuperator 150 downstream of the regenerative bed 160. Other configurations also may be used. For example, one or more of the other fuel cell components 290 also may be positioned in any orientation with respect to the stack 110, the recuperator 150, and the regenerative bed 160.

Positioning the regenerative bed 160 before the recuperator 150 may provide a higher temperature location. This location may allow the regenerative bed 160 to be smaller and less expensive for the desired capacity. Such a high temperature location may allow the regenerative bed 160 to reestablish a steady state temperature in a shorter amount of time after, for example, a transient event. Such a location, however, may make insulating the regenerative bed 160 more expensive in that a more expensive material may be required. Possible insulating materials may include thermal blankets, silicon porous materials, high-temperature porous materials, and similar types of materials.

Figure 4:
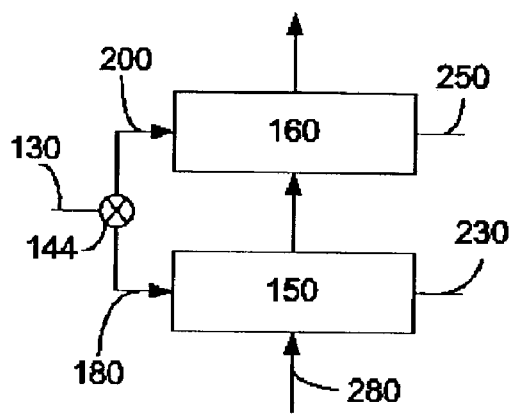
FIG. 4 is a schematic view of a partial fuel cell system with a regenerative bed for the oxidant flow.
Figure 5:
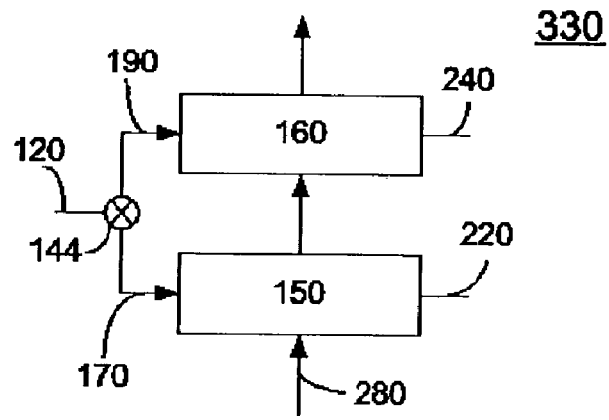
FIG. 5 is a schematic view of a partial fuel cell system with a regenerative bed for the fuel flow.

FIGS. 4 and 5 show further embodiments of the partial fuel cell system 100. FIG. 4 shows a partial fuel cell system 320 with a regenerative bed 160 used for the flow of oxidant only. Due to the flow rate of the fuel, it may not be necessary to use the regenerative bed 160 with the flow of fuel. Rather, the fuel may be sufficiently heated in the recuperator 150. The larger oxidant flow, however, may need the regenerative bed 160 to return to steady state temperatures. FIG. 5, on the other hand, shows a partial fuel cell system 330 that uses the regenerative bed 160 only for the passage of the fuel flow. Further, the partial fuel cell system 320 may be used with the partial fuel cell system 330 so as to heat both the flow of fuel and the flow of oxidant.

Figure 6:
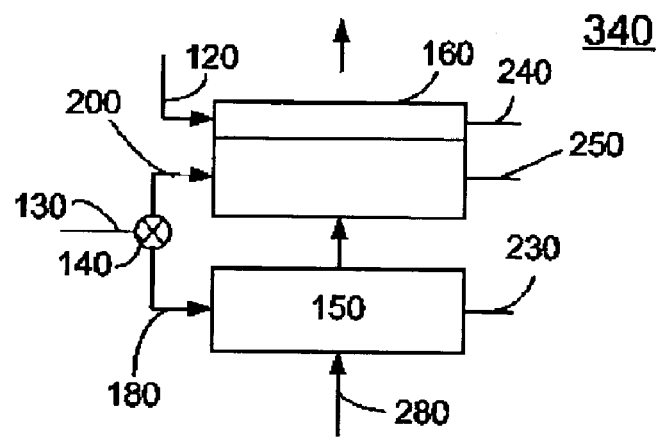
FIG. 6 is a schematic view of a partial fuel cell system with a regenerative bed for the oxidant flow and fuel flow.

FIG. 6 shows a further embodiment of the partial fuel cell system 100, a partial fuel cell system 340. In this case, a flow of the oxidant may be fed into both the recuperator 150 and the regenerative bed 160 via one of the flow controllers 140, the oxidant recuperator inlet 180, and the oxidant regenerative bed inlet 200. The oxidant may exit the recuperator 150 via the oxidant recuperator outlet 230 and exit the regenerative bed 160 via the oxidant regenerative bed outlet 250.

The regenerative bed 160, however, in this case may be used for both oxidant and fuel. As such, the fuel inlet 120 is connected to the regenerative bed 160. The fuel may exit the regenerative bed 160 via the fuel regenerative bed outlet 240. The regenerative bed 160 may be two separate units with a regenerative bed 160 for the flow of fuel and a regenerative bed 160 for the flow of oxidant. The regenerative bed 160 also may be a single unit with dedicated fuel and oxidant pathways therein. Any other orientation also may be used.

Figure 7:
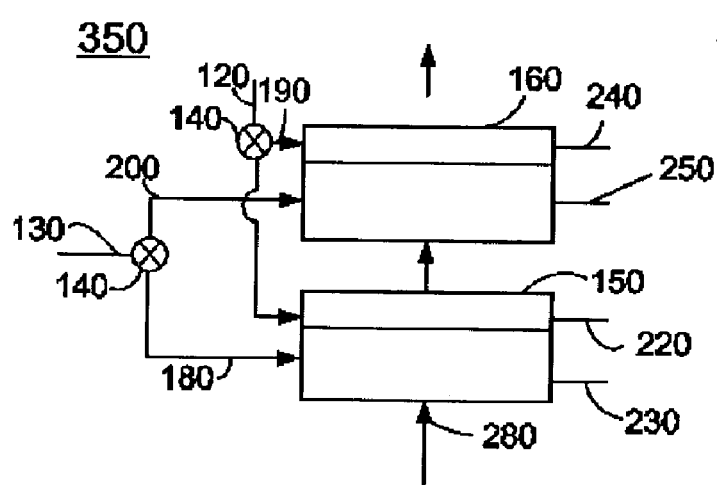
FIG. 7 is a schematic view of a partial fuel cell system with a recuperator and a regenerative bed for the oxidant flow and fuel flow.

FIG. 7 shows a further alternative embodiment of the partial fuel cell system 100, a partial fuel cell system 350. In this embodiment, as above, the oxidant may flow from the oxidant inlet 130 to and through the recuperator 150 and/or the regenerative bed 160 via one of the flow controllers 140, the recuperator oxidant inlet 180, and the regenerative bed oxidant inlet 200. The oxidant may exit the recuperator 150 via the oxidant recuperator outlet 230 and may exit the regenerative bed 160 via the regenerative bed oxidant outlet 250.

Likewise, the fuel in this case also may travel through the recuperator 150 and/or the regenerative bed 160. The fuel may travel via one of the flow controller 140 to the recuperator 150 through the recuperator fuel inlet 170 and/or to the regenerative bed 160 through the regenerative bed fuel inlet 190. The fuel exits the recuperator 150 via the recuperator fuel outlet 220 and exits the regenerative bed 160 via the regenerative bed fuel outlet 240. In this case the recuperator 150 and the regenerative bed 160 may be separate units for the passage of fuel and oxidant or the recuperator 150 and the regenerative bed 160 may have dedicated fuel and oxidant pathways therethrough. Any other orientation also may be used.

Figure 8:
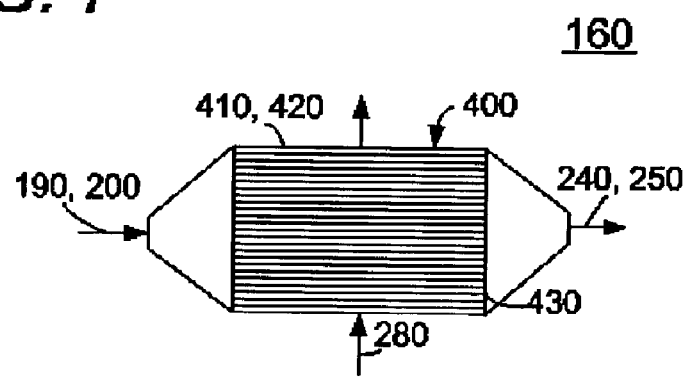
FIG. 8 is a side-cross sectional view of a channeled regenerative bed for use with oxidant or fuel flow.

FIG. 8 shows one embodiment of the regenerative bed 160, in this case a channeled bed 400. The channeled bed 400 may include a fuel compartment 410 and/or an oxidant compartment 420. The fuel compartment 410 and/or the oxidant compartment 420 may be positioned within a pathway 430. The fuel compartment 410 may be in communication with the flow of fuel via the regenerative bed fuel inlet 190 while the oxidant compartment 420 may be in communication with flow of oxidant via the regenerative bed oxidant inlet 200.

The compartment 410, 420 may be sized according to the anticipated flow or volume therethrough. The pathway 430 of the channeled bed 400 may be in communication with the stack exhaust outlet 280 such that the hot, spent gases from the stack assembly 110 continuously flow over the compartment 410, 420 so as to heat the compartment 410, 420 and the fuel and/or the oxidant therein. The compartment 410, 420 will absorb heat from the spent gases when the flow controller 140 blocks the flow of the fuel and/or the oxidant therethrough. The fuel and/or the oxidant will absorb this heat and the heat of the spent gases when the fuel and/or the oxidant are flowing therein. The spent gases may flow through the compartment 410, 420 in a cross-flow or a counter flow configuration. Other types of flow configurations may be used. The regenerative bed 400 thus acts in a manner similar to the recuperator 150.

Figure 9:
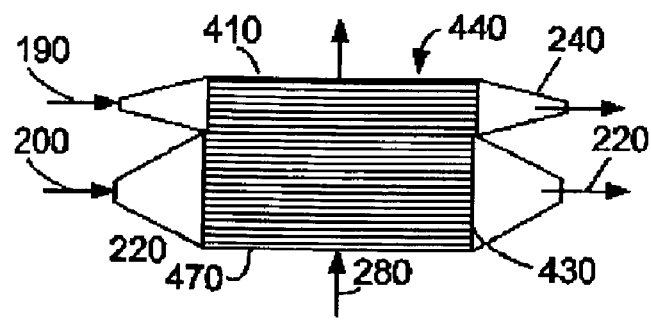
FIG. 9 is a side-cross sectional view of a channeled regenerative bed for use with oxidant and fuel flow.

FIG. 9 shows a further embodiment of the regenerative bed 760, in this case a regenerative bed 440. In this embodiment, both a fuel compartment 410 and an oxidant compartment 420 may be used. Because of the flow rate of the fuel through the flow compartment 410 may be slower that the flow rate of the oxidant through the oxidant compartment 420, the fuel compartment 470 may be smaller in size than the oxidant compartment 420. Although the fuel compartment 410 is shown as being downstream from the oxidant compartment 420, any orientation may be used. The fuel compartment 410 and the oxidant compartment 420 may be separate units or a single unit with dedicated fuel and oxidant pathways therethrough. Any other orientation also may be used.

Figure 10:
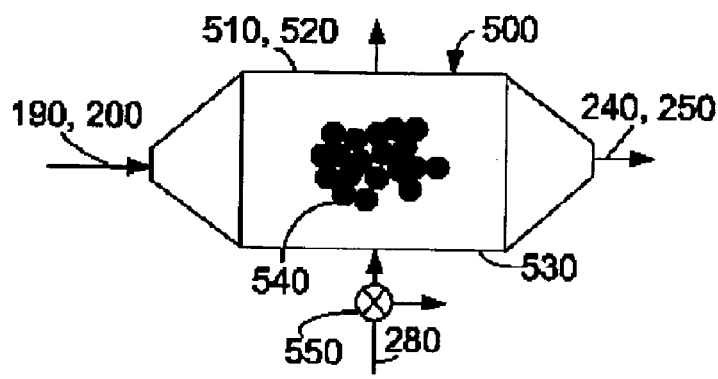
FIG. 10 is a side-cross sectional view of a sequential regenerative bed for use with oxidant or fuel flow.

FIG. 10 shows a further alternative embodiment of the regenerative bed 160, in this case a sequential heating bed 500. The sequential heating bed 500 may include a fuel compartment 510 and/or oxidant compartment 520. The fuel compartment 510 and/or the oxidant compartment 520 may be positioned within a pathway 530. The fuel compartment 510 may be in communication with a flow of fuel from the fuel regenerative bed inlet 190 while the oxidant compartment 520 may be in communication with a flow of oxidant from the oxidant regenerative bed inlet 200. The compartment 510, 520 may be sized according to the anticipated flow or volume therethrough.

A heat storage material 540 may be positioned within the compartment 510, 520. The heat storage material 540 may include particles of high heat-capacitance materials such as particles of lead, glass, or similar types of materials. The heat storage material 540 may be sized according to the anticipated flow rate through the compartment 510, 520. An additional bypass valve 550 may be positioned within or adjacent to the stack exhaust outlet 280. The bypass value 550 may be a simple on and off type value or a similar type of device. The bypass valve 550 may be controlled by the microprocessor 105 in a manner similar to the flow controllers 140.

The pathway 530 and the bypass valve 550 of the sequential heating bed 500 may be in communication with the stack exhaust outlet 280. The hot, spent gases from the stack assembly 110 may flow through the compartment 510, 520 so as to heat the material 540 therein when the flow controller 140 is shut and the bypass valve 550 is open. Likewise, the fuel and/or the oxidant may flow through the compartment 510, 520 and exchange heat directly with the materials 540 when the flow controller 140 is opened and the bypass valve 550 is closed.

Figure 11:
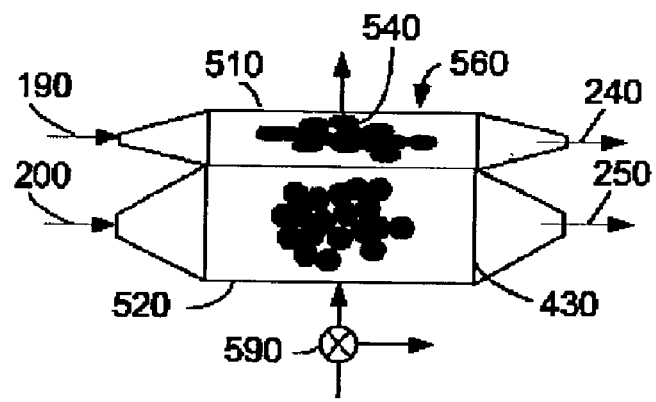
FIG. 11 is a side-cross sectional view of a sequential regenerative bed for use with oxidant and fuel flow.

FIG. 11 shows a further embodiment of the regenerative bed 160, in this case a regenerative bed 560. In this embodiment, both a fuel compartment 510 and an oxidant compartment 520 may be used. Because of the flow rate of the fuel through the fuel compartment 510 may be slower that the flow rate of the oxidant through the oxidant compartment 520, the fuel compartment 510 may be smaller in size than the oxidant compartment 520. Although the fuel compartment 510 is shown as being downstream from the oxidant compartment 520, any orientation may be used. The fuel compartment 510 and the oxidant compartment 520 may be separate units or a single unit with dedicated fuel and oxidant pathways therethrough. Any other orientation also may be used.

In use, the fuel inlet 120 and/or the oxidant inlet 130 may provide fuel and/or oxidant to one or more of the flow controllers 140. The incoming fuel and/or oxidant streams may be pressurized. In normal operations, the flow controllers 140 will direct the flow of the fuel and/or the oxidant towards the recuperator 150 and prevent any flow to the regenerative bed 160. In the recuperator 150, the flow of the fuel and/or the oxidant is heated by the spent gases from the stack assembly 110 flowing through the stack exhaust outlet 280. The heated flow of the fuel and/or the oxidant may then pass through the fuel recuperator outlet 220 and/or the oxidant recuperator outlet 230, through one or more of the mixers 210, and into the stack assembly 110 via the fuel stack inlet 260 and/or the oxidant stack inlet 270.

While the flow controller 140 prevents the flow of the fuel and/or the oxidant through the regenerative bed 160, the spent gases continue to flow therethrough. In the case of the channeled regenerative bed 400, 440, the spent gases continually flow over and heat the fuel and/or the oxidant compartments 410, 420 in a cross-flow or a counter-flow configuration. In the case of the sequential heating bed 500, 560, the spent gases flow directly through the fuel compartment 510 and/or the oxidant compartment 520 and heat the heat storage materials 540 therein. The spent gases may then be vented to the atmosphere or otherwise used.

As the power demands on the fuel cell system 100 increase, the flow of the fuel and/or the oxidant to the stack assembly 110 also may increase. These higher flow rates of the fuel and/or the oxidant require higher flows through the recuperator 180 and hence the temperature of the fuel and the oxidant at the entry of the stack assembly 110 may be decreased. As such, when the power demands on the fuel cell system 100 increase, for example, during transient operations, the flow controllers 140 may open, in part or whole, a flow of the fuel and/or the oxidant towards the regenerative bed 160 via the fuel regenerative bed inlet 190 and/or the oxidant regenerative bed inlet 200. The flow controllers 140 may be opened and closed by the microprocessor 105 based upon a predetermined load on the system 100 as a whole or the stack assembly 110 in specific. The flow controllers 140 may direct either fuel or oxidant or both to the regenerative bed 160. Other variables also may be used to operate the flow controllers 140 and the other components herein.

In the case of the channeled bed 400, 440, the fuel and/or the oxidant therein are warmed by the cross or counter flow of the spent fuel past the fuel and/or oxidant compartments 410, 420. In the case of the sequential heating bed 500, 560, the by-pass valve 550 may shut off the flow of the spent fuel through the fuel compartment 510 and the oxidant compartment 520 so as to allow the flow of the fuel and the oxidant therein. The fuel and the oxidant may then be heated by contact with the heat storage materials 540.

In either scenario, the fuel or the oxidant from the regenerative bed 160 are then mixed with the fuel or oxidant from the recuperator 150 in the mixers 210. The merged fuel and merged oxidant streams then enter the stack assembly 110 via the fuel stack inlet 260 and oxidant stack inlet 270. The temperature of the mixed fuel and the mixed oxidant flows may depend upon the flow rate through the regenerative bed 160. The mixed oxidant and fuel temperatures may be close to the normal operating temperatures such that the temperature affects on the stack assembly 110 may be minimized. The transition response time of the system 100 as a whole therefore may be reduced.

With respect to the channeled bed 400, 440 and the sequential heating bed 500, 560, the sequential heating bed 500, 560 may be of simpler design. The sequential heating bed 500, 560, however, requires the use of the by-pass valve 550. Further, because the spent gases and the fuel and the oxidant sequentially flow through the fuel compartment 510 and the oxidant compartment 520, some impurity may be introduced into the fuel and oxidant streams.

The regenerative bed 160 also may be used to heat other fluids as used within the fuel cell system 100. For example, steam and coolant may be preheated via the regenerative bed 160.

It should be apparent that the foregoing relates only to the preferred embodiments of the present invention and that numerous changes and modifications may be made herein without departing from the spirit and scope of the invention as defined by the following claims and equivalents thereof.

We claim:

1. A fuel cell system for converting a flow of a reactant to electricity and a flow of exhaust gases, comprising:
   a first heat exchanger for exchanging heat between the flow of exhaust gases and the flow of the reactant;
   a regenerative bed positioned within the flow of exhaust gases for exchanging heat between the flow of exhaust gases and the flow of the reactant; and
   a flow controller for selectively controlling the flow of the reactant to the regenerative bed in an on or off state.

2. The fuel cell system of claim 1, wherein the reactant comprises a fuel.

3. The fuel cell system of claim 1, wherein the reactant comprises an oxidant.

4. The fuel cell system of claim 1, further comprising an exhaust outlet for directing the flow of exhaust gases to the first heat exchanger and the regenerative bed.

5. The fuel cell system of claim 1, wherein the regenerative bed comprises a channeled bed.

6. The fuel cell system of claim 5, wherein the channeled bed comprises a reactant compartment for the flow of the reactant.

7. The fuel cell system of claim 6, wherein the reactant compartment is positioned in communication with the flow of exhaust gases.

8. The fuel cell system of claim 6, wherein the reactant compartment comprises a fuel compartment and an oxidant compartment.

9. The fuel cell system of claim 1, wherein the regenerative bed comprises a sequential bed.

10. The fuel cell system of claim 9, wherein the sequential bed comprises a reactant compartment for the flow of the reactant.

11. The fuel cell system of claim 10, wherein the sequential bed comprises a heat storage material positioned within the reactant compartment.

12. The fuel cell system of claim 11, wherein the heat storage material comprises a high-capacitance material.

13. The fuel cell system of claim 10, wherein reactant compartment is positioned in communication with the flow of the exhaust gases.

14. The fuel cell system of claim 10, wherein the sequential bed comprises a by-pass valve positioned in communication with the flow of exhaust gases so as to direct the flow of exhaust gases through or away from the reactant compartment.

15. The fuel cell system of claim 10, wherein the reactant compartment comprises a fuel compartment and an oxidant compartment.

16. The fuel cell system of claim 1, further comprising a mixer for mixing the flow of the reactant flowing through the first heat exchanger and the regenerative bed.

17. The fuel cell system of claim 1, wherein the first heat exchanger comprises a recuperator.

18. The fuel cell system of claim 1, wherein the first heat exchanger is downstream of the regenerative bed.

19. The fuel cell system of claim 1, wherein the regenerative bed is downstream of the first heat exchanger.

20. A partial fuel cell system, comprising:
   a stack assembly for converting a flow of a fuel and a flow of an oxidant to electricity and a flow of exhaust gases;
   a first heat exchanger for exchanging heat between the flow of exhaust gases from the stack assembly and the flow of the fuel and the flow of the oxidant;
   a regenerative bed positioned within the flow of exhaust gases for selectively exchanging heat between the flow of exhaust gases from the stack assembly and the flow of the fuel and the flow of the oxidant; and
   a flow controller system for selectively controlling the flow of the fuel and the flow of the oxidant to the regenerative bed in an on or off state.

21. The fuel cell system of claim 20, wherein the regenerative bed comprises a channeled bed.

22. The fuel cell system of claim 20, wherein the regenerative bed comprises a sequential bed.

23. A method for delivering a flow of reactant to a fuel cell stack at a predetermined temperature using the exhaust gases of the fuel cell stack, comprising:
   exchanging heat in a first heat exchanger between the exhaust gases of the fuel cell stack and the flow of reactant;
   determining a load on the fuel cell stack; and
   selectively exchanging heat in a regenerative bed positioned within the flow of exhaust gases between the exhaust gases of the fuel cell stack and the flow of reactant based upon the determined load on the fuel cell stack in an on or off state.

24. The method of claim 23, wherein the flow of reactant comprises a flow of fuel.

25. The method of claim 23, wherein the flow of the reactant comprises a flow of oxidant.

26. The method of claim 23, further comprising positioning the first heat exchanger adjacent to the fuel cell stack.

27. The method of claim 23, further comprising positioning the regenerative bed adjacent to the fuel cell stack.

* * * * *